United States Patent
Galindo-Legaria et al.

(10) Patent No.: US 6,757,671 B1
(45) Date of Patent: Jun. 29, 2004

(54) USE OF INDICES FOR QUERIES WITH COMPARISONS ON A FUNCTION

(75) Inventors: Cesar A. Galindo-Legaria, Redmond, WA (US); Rahul Kapoor, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 234 days.

(21) Appl. No.: 09/671,224

(22) Filed: Sep. 27, 2000

(51) Int. Cl.[7] .............................................. G06F 17/30
(52) U.S. Cl. ................................................. 707/3; 707/5
(58) Field of Search ................................. 707/3, 4, 5, 2

(56) References Cited

U.S. PATENT DOCUMENTS 5,548,755 A * 8/1996 Leung et al. ................... 707/2
5,548,758 A * 8/1996 Pirahesh et al. ................ 707/2
5,918,225 A * 6/1999 White et al. ................... 707/3

* cited by examiner

Primary Examiner—Diane D. Mizrahi
(74) Attorney, Agent, or Firm—Woodcock Washburn LLP

(57) ABSTRACT

An index is used for a query that contains an original condition having a comparison based on a function. An implied condition is first identified and applied to values in a column having multiple rows. An index is used to identify rows having values meeting the implied condition. Finally, the query is executed over the index using the original condition. Flags may be used to identify how to handle exceptions during run time. A table may be used to provide bounds for multiple different functions.

34 Claims, 5 Drawing Sheets

USE OF INDICES FOR QUERIES WITH COMPARISONS ON A FUNCTION

FIELD OF THE INVENTION

This invention relates generally to the field of computers, and in particular to the use of indices for database queries with comparisons on a function.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 2000, Microsoft Corporation, All Rights Reserved.

BACKGROUND

Relational data bases are collections of rows or tuples of data. Each row may have one or more columns containing information, such as numbers, names, addresses, etc. For example, a column might contain the names of people that pay taxes, with the address, social security number and other information contained in other columns. All the information in a row is related to the same person. A query can be written, requesting information from the database. One such query might be related to age. The query could be related to finding the average income for all people over a certain age.

Indices are commonly used to find rows satisfying a given condition. In the above example, an index might be based on age. Such an index would provide a sorted list of rows in ascending age. The index would allow a database to execute the query more quickly by only looking at a group of rows where age is greater than a certain age. It would allow the database to skip the rows that do not meet the age criteria.

The use of indices is a very powerful query execution technique, which can dramatically improve execution time and effort. The index provides some lookup structure that allows direct access to a row, given a specific column value, instead of having to examine each and every row of a given table, referred to as a scan of the entire table. An index on a column <col> can be use to find rows that satisfy conditions of the form <col> <cmp> <expr>. For example, an index on column T.a can be used to retrieve rows satisfying conditions T.a=5, or T.a>10.

The same index can be used to execute table joins, when the condition is of the form T.a=R.b. In this case, for each row of R, a specific value for T.b is determined, and all rows of T having such value are found through the index.

When a comparison is not made directly on a column, but on some computation, indices on columns are in general not applicable, and commercial products are typically unable to speed up execution by means of the index. For example, an index on column T.a is usually not exploited to locate rows satisfying a condition T.a*T.a>25. Note that values greater than 5.0, and also lower than −5.0 satisfy this condition. In general, for comparisons of the form f(<col>) <cmp> <expr>, (a function using the value of the column, and comparing the result with another expression) the index on <col> cannot be used to locate qualifying rows.

Type conversion is one common example of a function where indices are normally not used. Converting from floating point to integer is one example of type conversion. 'CONVERT(column, type)' is used to denote type conversion in the rest of the document. There are different ways to end up with queries that contain CONVERT(<col>) <cmp> <expr>. The condition could be written directly in such form by a user, or an implicit convert could be introduced by the system when operating on comparable types, such as integer and float. Another way to introduce this kind of comparisons is through inference from other conditions.

SUMMARY OF THE INVENTION

An index is used for a query that contains an original condition having a comparison based on a function over a column. An implied condition over the column is first identified and applied to restrict the rows to fetch from the index. Finally, the query is executed over the restricted set of rows using the original condition.

The implied condition identifies at least one bound for inequalities, and an upper bound and a lower bound for equalities and non-linear functions. The bound or bounds are calculated to be inclusive of all potential rows meeting the original condition, and to include as few rows not meeting the original condition as possible.

Implied conditions are fully determined at execution time once parameter values are known. A dynamic interval provides a flag indicating what bound to apply, lower bound, upper bound, or else special intervals such as all-rows-qualify, no-rows-qualify, or non-nulls-qualify. If an exception is encountered in the computation of implied bounding conditions, it is always safe to use the dynamic interval all-rows-quality, to consider all the rows.

In a further aspect of the invention implied conditions are identified for multiple functions. The bounds are calculated based on the implicit conditions, and are based on parameters contained in the query.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. A first section describes the operation of a computer system which implements the current invention. This is followed by a high level description of how indices are generated for queries having comparisons based on a condition. Further detail is then provided regarding how bounds for indices are constructed, and how flags are used for handling exceptions at run time. This is followed by a conclusion which describes some potential benefits and describes further alternative embodiments.

Hardware and Operating Environment

Figure 1:
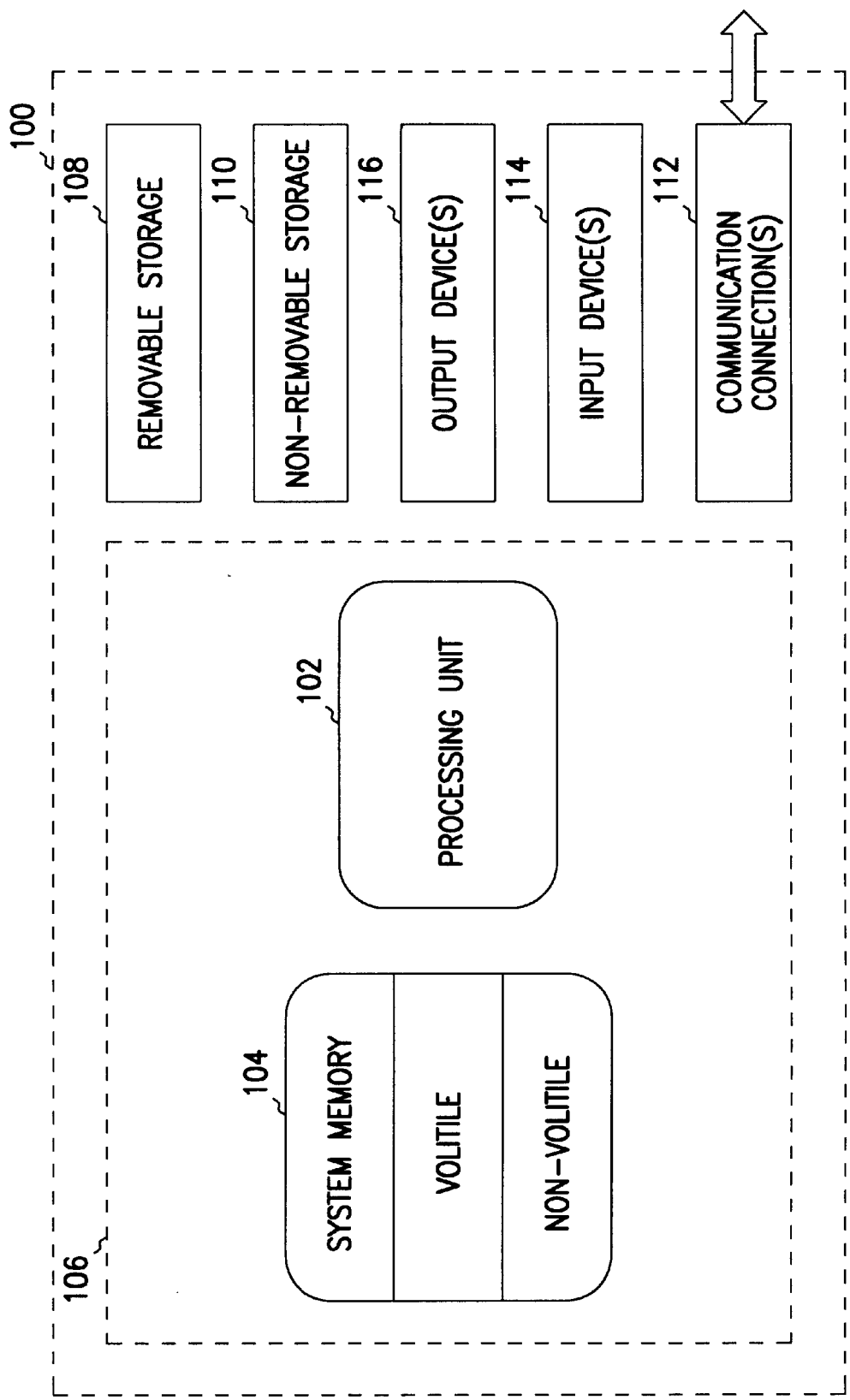
FIG. 1 is a block diagram of a computer system on which the present invention may be implemented.

An exemplary system for implementing the invention includes a computing device, such as computing device 100 in FIG. 1. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by broken line 106.

Device 100 may also include additional features/functionality. For example, device 100 may include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method of technology for storage of information such as computer readable instructions, data structures, program modules or other data. Memory 104, removable storage 108 and non-removable storage 110 are all examples of computer storage media. Computer storage media includes, but is not limited to RAM, ROM, EEPROM, flash memory or other memory technology, CD-ROM, digital versatile disks (DVD) or other optical storage, magnetic based storage or any other medium which can be used to store desired information and which can be accessed by device 100. Any such computer storage media may be part of device 100.

Device 100 may also contain communications connection(s) 112 that allow the device to communicate with other devices. Communications connection(s) 112 is an example of communication media. Communications media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct-wired connection, and wireless media such as acoustic, RF, infrared and other wireless media. The term computer readable media as used herein includes both storage media and communications media.

Device 100 may also have input device(s) 114 such as keyboard, mouse, pen, voice input device, touch input device, etc. Output device(s) 116 such as display, speakers, printers, etc may also be included. All these devices are well known in the art.

This invention may be described in the context of computer-executable instructions, such as program modules, executed by one or more computer or other devices such as device 110. Generally, program modules include routines, programs, objects, components, data structures, etc. that perform particular tasks or implement particular abstract data types. Typically the functionality of the program modules may be combined or distributed as desired in various embodiments.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

The invention is described with the use of flowcharts which contain functional blocks. The blocks may be implemented in one or more software or hardware modules as desired, and are performed on computing device 100 in the context of a database system.

Use of Indices

Sometimes queries compare a column with an expression of a different type, so it is necessary to do a type-conversion before the comparison. The expression can also be a non-linear function, such that it is difficult to use an index to answer the query because one does not know how to locate to the specific rows in index which will satisfy the condition as the condition is not stated on the column but on a function of the column.

In a type conversion example, float(T.a) >=2.1. The comparison value can be a constant, a query parameter, a column from another table, or the result of some computation such as an aggregate, or a subquery. In the end, the column is being compared with a value that is of a different type, and the proper comparison requires a type conversion on the column. To solve this problem, a covering range is generated which might be slightly wider than the actual qualifying range, and an index is used to directly obtain such rows.

Figure 2A:
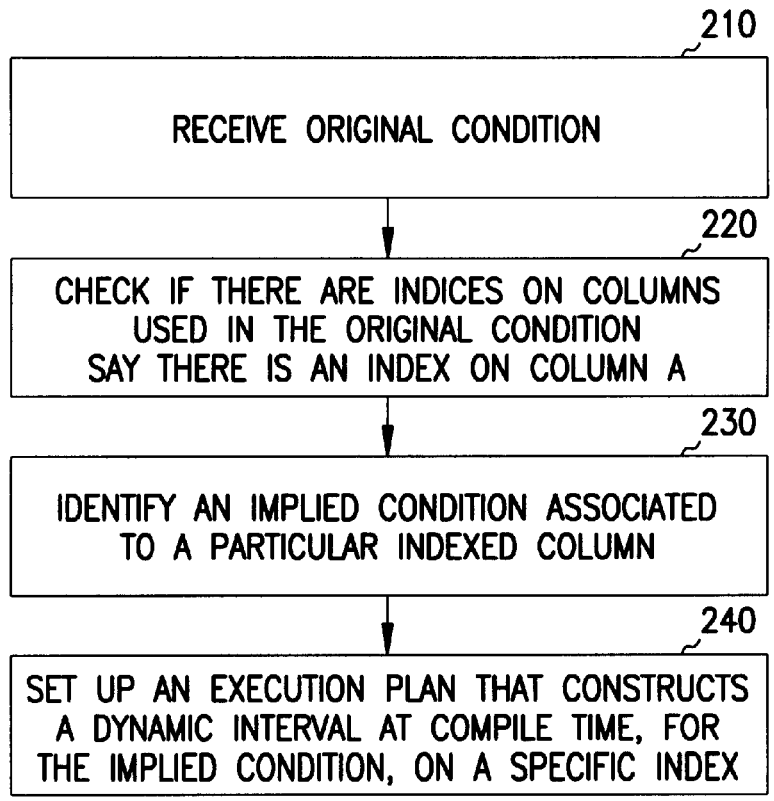
FIG. 2A is a flow chart showing the overall operation of using indices for queries in accordance with the invention at compilation time.
Figure 2B:
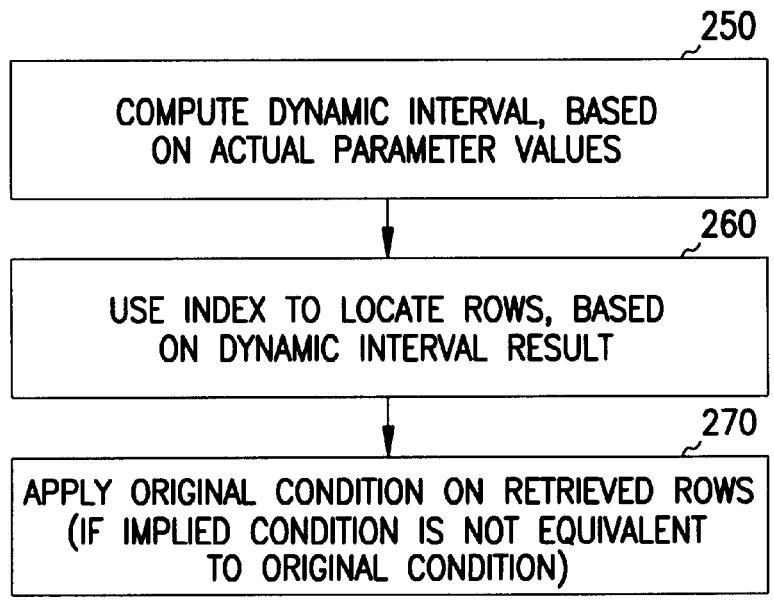
FIG. 2B is a flow chart showing the overall operation of using indices for queries in accordance with the invention at execution time.

The overall process is shown in FIGS. 2A and 2B. An original condition is received at 210. It may be of the form: convert(column) <comparision> <expression>. At 220, a check is made to see if there are indices on columns used in the original condition. Say there is an index on column A. Implied conditions associated to a particular indexed column are then identified at 230. It may be of the form: convert (column) <comparision> <expression>. The implied condition is used to determine bounds which identify a range of values which is slightly wider than the actual qualifying range in a column of values, to identify qualifying rows. During execution the implied conditions are evaluated to generate bounds and locate to the set of qualifying rows using an index on the column. At 240, an execution plan is set up that constructs a dynamic interval at compile time, for the implied condition, on a specific index.

At execution time starting at 250, a dynamic interval is computed, based on actual parameter values. Exceptions are generated while determining a specific dynamic interval to use. The Exception handling is "inside" of the determination of the dynamic interval, which would indicate all-rows-qualify, if needed (e.g. if there was an exception). The dynamic interval could say "get all A>10 and A<20," or it could say "all-rows-qualify," or it could say "no-rows-qualify." The logic to determine the dynamic interval is included in the query plan, based on the actual parameter values. Then the dynamic interval is passed to index scan/lookup code 260 to retrieve the actual rows. The index is used to locate rows, based on dynamic interval results. The original condition is then applied at 270 on retrieved rows (if implied condition is not equivalent to original condition).

The reduced set of rows, or range constructed should be i) safe meaning that all the qualifying rows are included and ii) tight meaning that few, if any, redundant rows are included.

This is an example of derivation of a safe and tight range:

Original condition: CONVERT(Aint, float)>2.5

Implied condition: Aint>2

Figure 3:
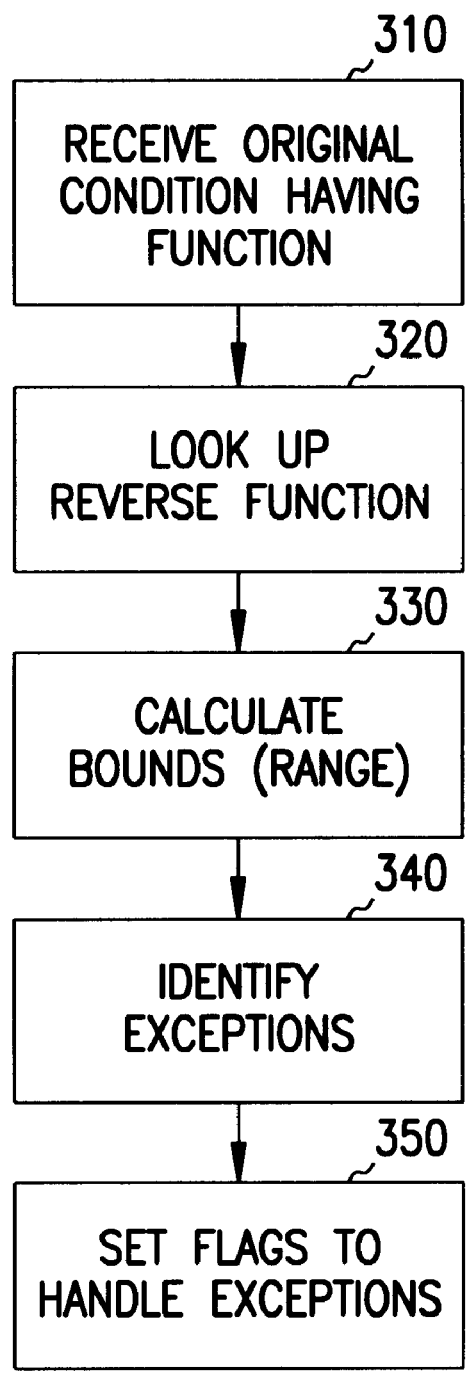
FIG. 3 is a flow chart showing the calculation of a range at compilation and execution.

The original condition can be part of a query, and is received at 310 in the flowchart of FIG. 3. FIG. 3 contains both compilation and execution time components. There are advantages to doing as much analysis as possible at compilation time rather than execution time, because there are likely to be many executions for one compilation. In one embodiment, blocks 310 and 320 take place at compilation time, and 330, 340, 350 are performed at execution time. This implies that the result of looking up the reverse function is passed to the execution time, which is done through the execution plan.

An expression to compute the implied condition is constructed using the reverse of the original function which can be looked up from a table of reverse functions at 320. While an index on Aint cannot be used to directly find rows that qualify the original condition, the implied condition Aint >2 can be used for index lookup. The value for comparison need not be a constant, so there is a need to determine the exact bounds at run time from the expression constructed to compute them at compile time as indicated at 330. In other words, the value shown above, "2.5" might actually be a parameter, such as "z", which is only given an actual value when a compiled query is executed.

The following query is used as an example:

Select * from T where convert (A, float)>@f where @f is defined as a floating point parameter. T is a table having at least one column A, which is an integer, and multiple rows. The reverse function or bound is identified as {A>convert (@f, int)−1}. It is also referred to as a seek predicate. The "−1" is added to make sure that all rows that qualify are within the range, or that the range is safe. It is essentially the next lower number in the domain of the type or other function. It is derived from looking at what happens to such a comparison when floating point values are truncated during execution of the reverse function.

Exceptions on the computation of the implied condition need to be handled, and not passed to a user, because the implied condition was not part of the original query. Exceptions are then identified at 340. An exception can occur because the range of values identified may result in a value being generated that is no longer of the desired type. It is said to be outside of the domain of the type. By ensuring that the range was safe above, "−1" was subtracted, which could lead to a number outside the domain of type integer (There can be limitations regarding the domain of a type, like 0 to 255, or −36500 to +36500, and falling outside of the range is not safe). Other exceptions may also occur, and are described in further detail below in conjunction with dynamic ranges. Once the exceptions are identified, flags are set at 350 to handle the exceptions during execution of the query in a desired manner depending on the type of exception.

If the above query is changed to include an equality:

Select * from T where convert (A, float)=@f then an upper bound must also be generated. In this case, the upper bound is identified as {A<convert (@f, int)+1}. "+1" was added to increase the upper bound to make the range safe. It is essentially the next higher number in the domain of the type or other function. It is similar to the "−1" added for the lower bound. It will vary depending on the conversion function contained within the original condition. It may be another constant, or an actual function that is evaluated at run time. The upper bound was not required in the inequality above. It can be seen that there are also cases where a lower bound is not required.

In general, two implied conditions are generated for equalities as described above. An implied condition is generated for each lower and each upper bound. If the original comparison is, say a lower bound only, then there is no implied upper bound and it won't be generated. When the convert comparison is equality, then both bound are generated. For example:

Original condition: CONVERT(Aint, float)=2.5

Implied lower bound: Aint>TRUNCATE(2.5)−1.0=1

Implied upper bound: Aint<TRUNCATE(2.5)+1.0=3

Figure 4:
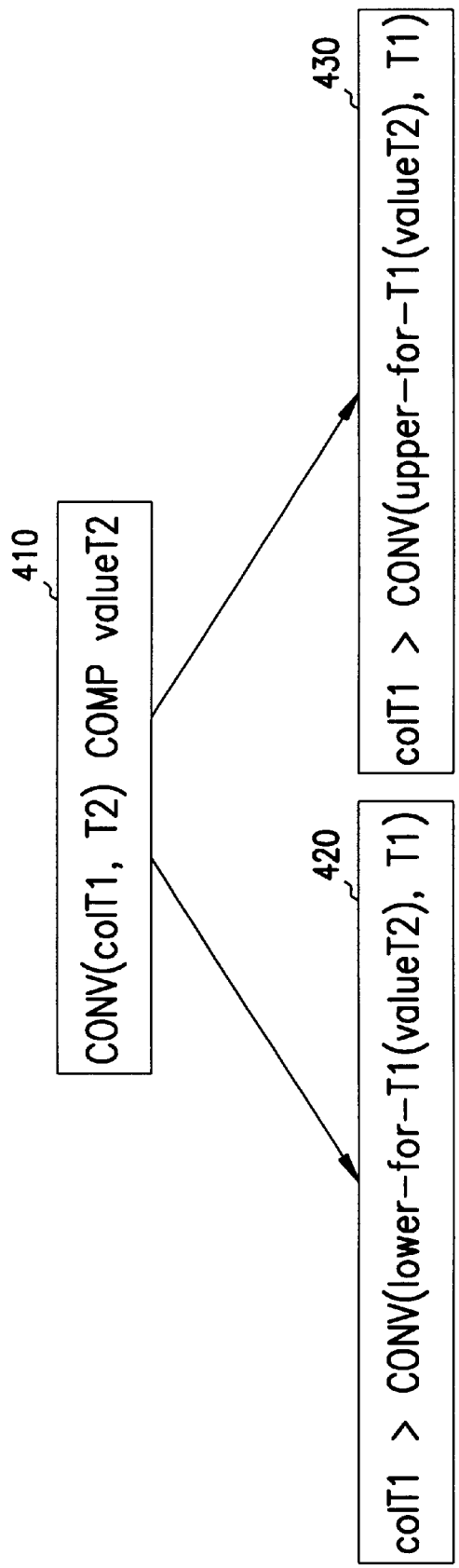
FIG. 4 is a block diagram showing the relationship between original conditions and implicit conditions.

FIG. 4 shows the derivation of bounds for a parameterized original condition. The original condition is described at 410 as a column 'colT1' of type T1, which is converted to type T2, then compared with some 'valueT2' of type T2. Starting with an original comparison, implied comparisons CLower and CUpper are defined at 420 and 430 respectively.

The new, resulting comparisons are now directly on the column, and an existing index can immediately be applied. There is no guarantee that the implied conditions are equivalent to the original one, so the original is still applied on all the rows retrieved from the index. At that point, however, the number of rows to consider has been reduced by the implied comparison.

Dynamic Intervals

There are some situations wherein the implied bounds as described above may not be sufficient. The bounding expression may run into a problem with overflows or underflows. So, simply adding the comparison may result in an invalid execution error. To address this issue, and to further optimize the plans generated, dynamic intervals are generated at query execution time. Unlike a regular comparison, such as those typed directly in SQL, a run-time comparison flag is generated. Such a comparison flag has standard comparison operators, plus three more alternatives:

Less than (LT), less than or equal (LTE), greater than (GT), greater than or equal (GTE), etc.

All rows qualify (CMPALL).

All non-null rows qualify (CMPNOTNULL).

No rows qualify (CMPFALSE).

Figure 5:
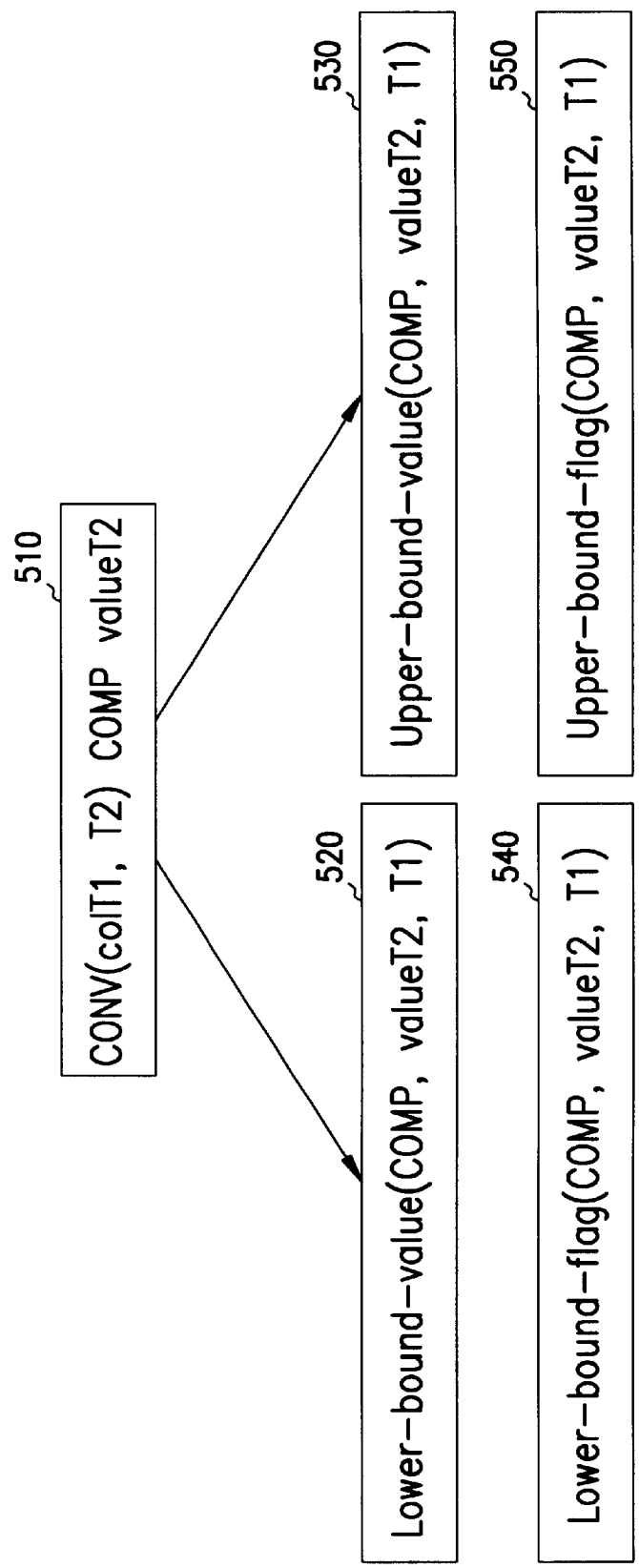
FIG. 5 is a block diagram showing the relationship between original conditions and implicit conditions, and the use of flags.

A comparison is manufactured at run time, which determines which of these to use. Each lookup range for a specific column is made up of a bound value, plus a comparison flag, each computed dynamically at run time. FIG. 5 is a refined diagram of the implied bounds. The original condition is described at 510 as a column colT1 of type T1, which is converted to type T2, then compared with some valueT2. Starting with an original comparison, implied comparisons CLower and CUpper are defined at 520 and 530 respectively. Flags are defined for the lower and upper bounds at 540 and 550 respectively.

The pair of bounds and the flag are used in the index lookup code to retrieve the specified rows. For example, the equality case is further refined as follows:

Original condition: CONVERT(Aint, float)=2.5

Lower bound: TRUNCATE(2.5)=2

Lower bound flag: IF CONVERT(TRUNCATE(2.5), float)=2.5 THEN GTE

ELSE FALSE

Upper bound: TRUNCATE(2.5)=2

Lower bound flag: IF CONVERT(TRUNCATE(2.5), float)=2.5 THEN LTE

ELSE FALSE

Basically, if the float to be compared is "aligned with an int," the specific value of interest is looked up; otherwise after conversion no integer will match, so no rows are retrieved. In the first case, the resulting intervals are TRUNCATE(value)<=column<=TRUNCATE(value)

In the second case, where no conversion will match, the following bound is generated, which is empty:

TRUNCATE(value) CMPFALSE column

When expressions are known at compile time, they can be executed and reduced to specific intervals. But in general, they have to be resolved and evaluated at query execution time, when all parameter values are known. Since the interval is resolved dynamically at execution time, different values of a parameter result in the proper index lookup.

A query processor is modified to perform the above process. The following is a summary of the changes in code to perform the methods described above:

i) index processing code automatically identifies predicates of the above form as seekable ii) depending on the comparision and the types involved, bounds are constructed. For example convert(column)= <expr> translates into a seek predicate of the form column>lowerbound and column<upperbound The lowerbound is set up by an expression which is evaluated at run-time to convert <expr> into the type of the column and then getting to the next lower value in the domain of the type which ensures that the bound is safe. So for comparing an integer column to a floating point expression, the floating point expression is truncated to an integer and "1" is subtracted. The upperbound is constructed similarly by converting expr into the type of the column and then getting to the next higher value in the domain of the type which ensures that the bound is safe.

iii) a mechanism is built to trap runtime exceptions like overflows and underflows during the evaluation of the bounds and in this case set the comparison flag to CMPALL. This guarantees consistent semantics in the rare cases when the domain boundaries for the involved types are crossed.

iv) special cases of interest are addressed by using more elaborate functions to compute bounds and flags, such as the equality of conversion from integer to float, as described above.

v) the original predicate is always tagged on as a residual predicate to eliminate any extraneous rows which may qualify the seek because our bounds were inexact or because there was an exception during construction of the bound and the seek was converted into a scan. The overhead of applying the residual predicate is negligible compared to the real costs of fetching the appropriate rows which decrease dramatically by the ability to use the index.

Conclusion

This application is intended to cover any adaptations or variations of the present invention. It is manifestly intended that this invention be limited only by the claims and equivalents thereof. An index is used for a query that contains an original condition having a comparison based on a function. The index may be created, or an existing index over a desired column may be used. An implied condition is first identified, which qualifies all rows that also qualify the original condition, but is in a form that can be used for index lookup. The index is used to identify rows having values meeting the implied condition. Finally, the query is executed over the identified rows using the original condition.

While flags are used to handle exceptions, other constructs may also be used, including the use of exception handling code in the query execution plan. While examples of integer and floating point type conversions have been used, it is understood that the invention applies to other type conversions such as time, numerics with differing precision and for string comparisons.

We claim:

1. A method of using an index for a query that contains a comparison based on a function, the method comprising:

determining a range of values for a column compared based on said function, the range including at least all desired rows;

obtaining an index for the column compared; and executing the query using the index.

2. The method of claim 1 wherein the range comprises an upper bound and a lower bound.

3. The method of claim 1 wherein the range includes a minimal number of redundant rows.

4. A machine readable medium having instructions for causing a machine to perform a method of using an index for a query that contains a comparison based on a function, the method comprising:

determining a range of values for a column compared based on said function, the range including at least all desired rows;

obtaining an index for the column compared; and executing the query using the index.

5. The machine readable medium of claim 4 wherein the range comprises an upper bound and a lower bound.

6. The machine readable medium of claim 5 wherein the range is safe and tight (where all qualifying rows are included and where there are few, if any, redundant rows in said range).

7. A system that uses an index for a query that contains a comparison based on a function, the system comprising:
- a module that determines a range of values for a column compared based on said function, the range including at least all desired rows;
- a module that obtains an index for the columns compared; and
- a module that executes the query using the index.

8. A method of using an index for a query that contains an original condition (an initial state of a query) having a comparison based on a function, the method comprising:
- identifying an implied condition (a resultant state of a query derived from the query's initial state) based on said function;
- applying the implied condition to values in a column having multiple rows;
- obtaining an index to all rows having values meeting the implied condition; and
- executing the query over the index using the original condition.

9. The method of claim 8 wherein the implied condition comprises an upper bound and a lower bound.

10. The method of claim 9 wherein the bounds comprise reverse functions.

11. The method of claim 9 wherein the bounds are parameterized to allow substitution of values at run time.

12. The method of claim 8 wherein the index includes a minimal number of redundant rows.

13. The method of claim 8 wherein the function comprises a function selected from the group consisting of type conversions and non-linear functions.

14. The method of claim 8 and further comprising dynamic intervals.

15. The method of claim 14 wherein the dynamic intervals comprise bounding expressions.

16. The method of claim 14 wherein the bounding expressions contain at least one of the operators, all rows qualify, all non-null rows qualify and no rows qualify.

17. The method of claim 8 wherein the query is executed over the full column if an exception occurs.

18. A machine readable medium having instructions for causing a machine to perform a method of using an index for a query on a table having multiple rows, wherein the query contains an original condition (an initial state of a query) having a comparison based on a function, the method comprising:
- identifying an implied condition (a resultant state of a query derived from the query's initial state) based on said function;
- applying the implied condition to values in a column;
- obtaining an index to all rows having values meeting the implied condition; and
- executing the query over the index using the original condition.

19. A system that uses an index for a query that contains an original condition (an initial state of a query) having a comparison based on a function, the method comprising:
- means for identifying an implied condition (a resultant state of a query derived from the query's initial state) based on said function;
- means for applying the implied condition to values in a column;
- means for obtaining an index to all rows having values meeting the implied condition; and
- means for executing the query over the index using the original condition.

20. A method of using an index for a query that contains an original condition (an initial state of a query) having a comparison based on a function, the method comprising:
- identifying an implied condition (a resultant state of a query derived from the query's initial state) based on said function;
- selecting an index over a desired column; and
- applying the implied condition to values in the index to obtain a range of rows meeting the implied condition.

21. The method of claim 20 wherein the implied condition comprises an upper bound and a lower bound.

22. The method of claim 20 wherein the function is selected from the group consisting of type conversions and non-linear functions.

23. The method of claim 20 and further comprising using bounding expressions.

24. The method of claim 23 wherein the bounding expressions identify at least one of whether all rows qualify, all non-null rows qualify and no rows qualify.

25. The method of claim 20 and further comprising using a table to identify how to determine the bounds for each comparison based on a function.

26. The method of claim 20 wherein the query contains at least one parameter that affects the implied condition.

27. A machine readable medium having instructions for causing a machine to perform a method of using an index for a query that contains an original condition (an initial state of a query) having a comparison based on a function, the method comprising:
- identifying an implied condition (a resultant state of a query derived from the query's initial state) based on said function;
- selecting an index over a desired column; and
- applying the implied condition to values in the index to obtain a range of rows meeting the implied condition.

28. A method of executing a query that contains an original condition (an initial state of a query) having a comparison based on a function, the method comprising:
- obtaining a query execution plan;
- identifying a safe range (where all qualifying rows are included) within an index; and
- applying the original condition based on said function to rows identified by the index.

29. A method of executing a query that contains an original condition (an initial state of a query) having a comparison based on a function, the method comprising:
- obtaining a query execution plan;
- identifying a safe and tight range (where all qualifying rows are included and where there are few, if any, redundant rows in said range) within an index;
- executing the query by applying the original condition based on said function to rows identified by the index; and
- handling exceptions that occur during execution of the query.

30. The method of claim 29, wherein an exception causes the query execute without the use of the index.

31. The method of claim 29 and further comprising setting a flag to identify how to handle an exception.

32. The method of claim 31 wherein the flag represents an operation selected from the group consisting of, less than, less than or equal to, greater than or equal to, equal to, all rows qualify, all non-null rows qualify and no rows qualify.

33. The method of claim 29 wherein identifying a safe and tight range comprises substituting values from the query for parameters identified in the execution plan.

34. A machine readable medium having instructions for causing a machine to perform a method of executing a query that contains an original condition (an initial state of a query) having a comparison based on a function, the method comprising:

obtaining a query execution plan;

identifying a safe and tight range (where all qualifying rows are included and where there are few, if any, redundant rows in said range) within an index;

executing the query by applying the original condition based on said function to rows identified by the index; and handling exceptions that occur during execution of the query.

\* \* \* \* \*